March 10, 1953     L. W. CARLSON     2,630,995
MOUNTING BRACKET FOR SEMAPHORE SIGNAL DEVICES
Filed May 24, 1949
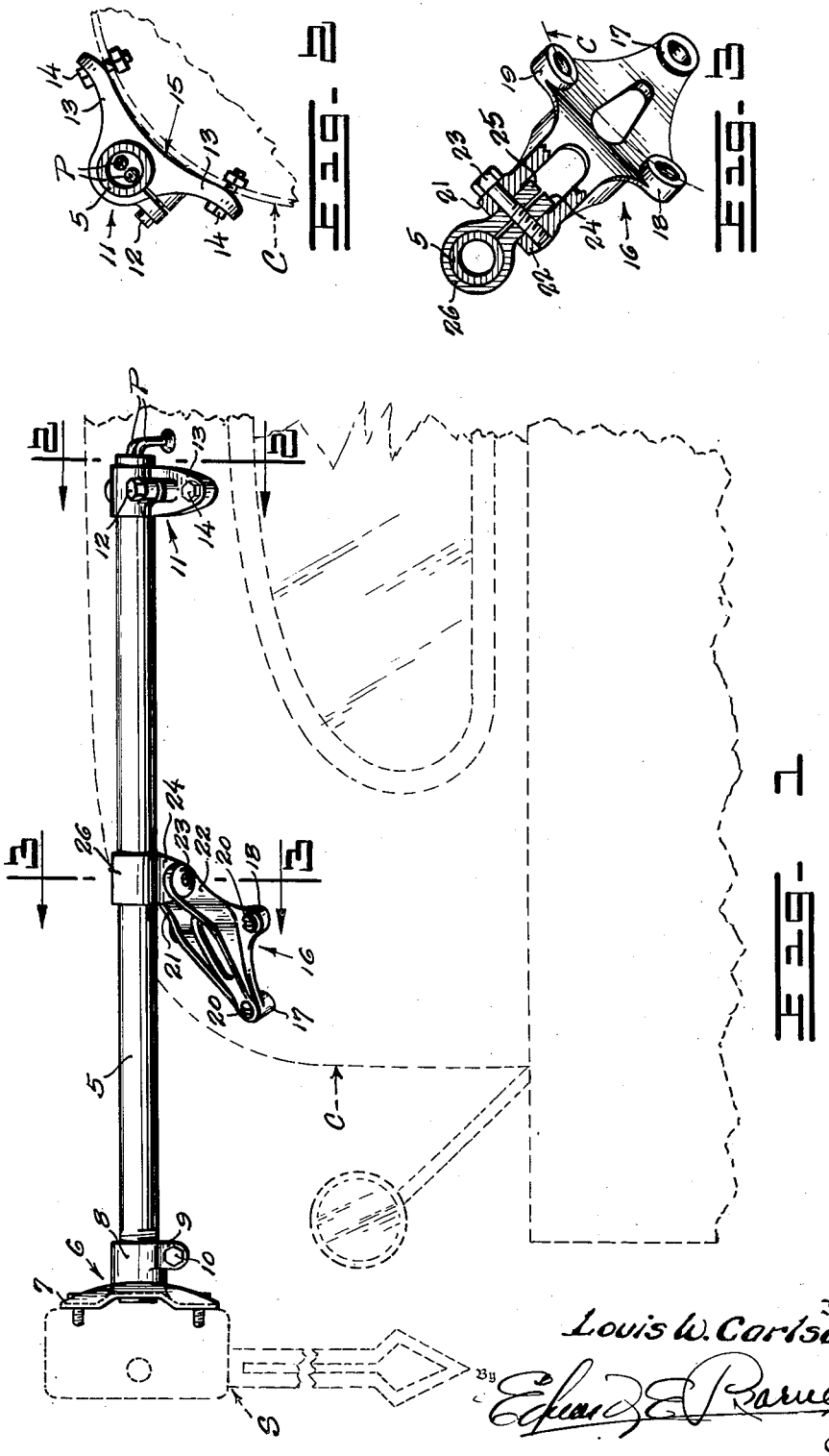
Inventor
Louis W. Carlson
By Edward E. Barner
Attorney Patented Mar. 10, 1953

2,630,995

UNITED STATES PATENT OFFICE 2,630,995

MOUNTING BRACKET FOR SEMAPHORE SIGNAL DEVICES

Louis W. Carlson, San Fernando, Calif., assignor to Monarch Bracket Company, Riverside, Calif., a firm Application May 24, 1949, Serial No. 94,966

7 Claims. (Cl. 248—201)

This invention relates to a mounting bracket, particularly one for use in supporting a semaphore signal device upon the driver's cab of a truck, and has for its objects the provision of a simple and inexpensive yet ruggedly constructed bracket which will establish a rigid mounting base for the signal device, which takes purchase from the truck cab through the instrumentality of two complementing bearing members, and which is so engineered as to admit of the bearing members being easily and quickly fitted to substantially any surface curvature of which the driver's cab partakes.

Other more particular objects and advantages will, with the foregoing, appear and be understood in the course of the following description and claims, the invention consisting in the novel construction and in the adaptation and combination of parts hereinafter described and claimed.

In the accompanying drawing:

Figure 1 is an elevational view showing the now-preferred embodiment of the invention installed upon the driver's cab of a truck, and with dotted lines being employed to fragmentarily illustrate the truck and also to portray a semaphore signal device carried by the bracket, the vantage point from which the illustrated parts are viewed being to the rear of the cab.

Figs. 2 and 3 are vertical sectional views, each transverse as respects the bracket, taken to an enlarged scale on the lines 2—2 and 3—3, respectively, of Fig. 1.

Referring to said drawing, the numeral 5 denotes a stock-piece made by preference from a fairly long section of metal tubing, and rigidly secured as a permanent attachment to an end of this stock-piece is a fitting 6 arranged and adapted to serve as a mounting base for a semaphore signal device which I indicate generally by the letter S. Such fitting is here shown as comprising a plate 7 made integral with a center-bored hub 8 which is threaded upon the stock, and having the hub partially split and presenting apertured ears 9 accommodating a clamping bolt 10 to immovably fix the fitting upon the stock. In lieu of this construction, the fitting could, if desired, be welded to the stock and thus made an integrated part of the same. The end to which the fitting is applied is, in the use of the bracket, the outer end and will be hereinafter so termed.

The opposite or inner end of the stock-piece is received within the cylindrical bore of a block 11. Other than for the fact that the body proper of this block is split and is clamped rigidly upon the stock-piece by a cap screw 12, the same is made much in the form of a plain or pedestal bearing and has each of its oppositely directed lugs 13 apertured for the reception of securing bolts 14. It is a characteristic of this block that the footing surface 15 is concave in end elevation.

As a complement to this end block, the present bracket provides a second footing member 16 which is arranged to occupy a position more or less central to the length of the stock-piece. This member is triangular in plan configuration and presents at each of its three corners a depending bearing foot, as 17, 18 and 19, and the underside or bearing faces of these feet each slant inwardly and upwardly toward a common center. Otherwise and more particularly stated, the three feet present much the appearance of ungular posts and are placed to occur one at each vertex of an imagined spherical triangle with the bearing faces so made as generally to conform to the surface contour of the latter. Between these projecting feet, the footing member is substantially relieved throughout the areal extent of its underside. The several feet are each vertically apertured for the reception of a respective mounting screw 20, and each said aperture desirably tapers from a narrow opening at the top to a wide opening at the bottom, thus to give flexibility to the mounting in the sense that the screws, in their application, need not be placed co-axial to the feet but rather may be disposed on radii of substantially any sphere imagined within a wide range of diameters and hence assures to the footing member a firm mounting on the crowned side of a truck cab irrespective of the sundry compound curves which may be employed in the make-up thereof. The said footing member presents a bifurcated extension projecting angularly upwardly from an end thereof, and the furcate arms 21—22 which this extension provides occur as substantial prolongations of two surface ribs which reinforce the member. The end extremities of such furcate arms are each bossed and pierced by co-axial apertures, one of which is tapped, and a cap-screw 23 received through the smooth-bored aperture and working in the tapped opening operates to establish clamping pressure upon the introduced ears 24—25 of a clamping collar 26 applied to the stock-piece.

It is thought that the invention will have been clearly understood from the foregoing detailed description of the now preferred embodiment of my invention, taken in conjunction with an inspection of Fig. 1 wherein I have shown the bracket applied to the cab C of a truck in the performance of its intended end of supporting the semaphore signal. The fact of the two footing members being each adjustable both rotatably and endwise upon the stock-piece, taken in conjunction with the particular curvatures to which the bearing face of each said footing piece partakes, and the added ability to adjust the footing member 16 about the center of the cap-screw 23 as a swivel axis, permits the bracket to adapt itself to substantially any shape of cab. The bracket is particularly designed for use with a semaphore signal device of the type controlled by force of vacuum created within the engine cylinders, the supply pipes therefor and which I denote by P in Fig. 1 leading to the signal device through the hollow center of the stock-piece. Little ingenuity would, however, be required in order to adapt the stock-piece to the reception of mechanical controls.

Minor changes in the details of construction may be resorted to without departing from the spirit of the invention, and it is therefore my intention that no limitations be implied and that the hereto annexed claims be given a scope fully commensurate with the broadest interpretation to which the employed language fairly admits.

What I claim is:

1. In a mounting bracket for a semaphore signal device, and in combination with a tubular stock-piece presenting means at the outer end thereof for attaching the signal device to the stock-piece, two mounting members arranged to foot upon the exterior surface of a truck cab and each releasably clamped to the stock-piece to admit of the same being adjusted both rotatably and endwise of the stock-piece, one of said members being adapted to occupy a position at the inner end of the stock-piece and having its footing surface arched to generally conform to the curving back of the cab and the other of said members being adapted to occupy a position intermediate the length of the stock-piece and having its footing surface vaulted to generally conform to the rounding shoulder of the cab.

2. The mounting bracket of claim 1 in which the mounting member which lies at the inner end of the stock-piece is made in the form of a pedestal bearing.

3. The mounting bracket of claim 1 in which the mounting member which lies intermediate the length of the stock-piece provides a footing base which is made triangular in plan configuration and derives footing support from pendant feet located one at each of the three corners of the triangular base.

4. A mounting member adapted to be secured in footing engagement upon the rounding shoulder of a truck cab and comprising a mounting base presenting three pendant feet each pierced with a bolt-hole and characterized in that the feet are ungular in shape and placed to occur one at each vertex of an imagined spherical triangle with the slope of the bearing faces conforming to the surface contour of the latter.

5. As a mounting member adapted to be secured upon the rounding shoulder of a truck cab and used as the footing support for an accessory-carrying standard, a mounting base of triangular plan configuration having a bifurcated extension projecting angularly upwardly from an end thereof, a split collar adapted to fit the standard and presenting opposing jaws which extend laterally as prolongations of the collar and fit between the furcate arms of said bifurcated extension, and a shackle bolt carried by said furcate arms for exerting clamping pressure upon the introduced jaws to draw the collar tight upon the standard, the base having three pendant feet each pierced with a bolt-hole and characterized in that the same are ungular in shape and placed to occur one at each corner of the base with the slope of the bearing faces conforming to the surface contour of an imagined spherical triangle.

6. The mounting member of claim 5 in which the bolt-holes which pierce the pendant feet taper from a narrow opening at the top to a wide opening at the bottom.

7. The mounting member of claim 5, said shackle bolt lying transverse to the longitudinal median line of the base and permitting swivel adjustment of the latter relative to the collar.

LOUIS W. CARLSON.

REFERENCES CITED

The following references are of record in the file of this patent:

UNITED STATES PATENTS

| Number | Name | Date |
|---|---|---|
| 2,388,625 | Wagenknecht | Nov. 6, 1945 |
| 2,440,409 | Lehmann | Apr. 27, 1948 |

FOREIGN PATENTS

| Number | Country | Date |
|---|---|---|
| 49,274 | France | Nov. 12, 1938 |